(12) United States Patent
Schoenberger et al.

(10) Patent No.: US 9,045,285 B2
(45) Date of Patent: Jun. 2, 2015

(54) STERILE HEATING APPARATUS FOR PLASTICS MATERIAL PRE-FORMS

(71) Applicant: Krones AG, Neutraubling (DE)

(72) Inventors: Wolfgang Schoenberger, Brennberg (DE); Gerhard Schwoed, Alteglogsheim (DE)

(73) Assignee: KRONES, AG, Neutraubling (DE)

( * ) Notice: Subject to any disclaimer, the term of this patent is extended or adjusted under 35 U.S.C. 154(b) by 70 days.

(21) Appl. No.: 13/940,672

(22) Filed: Jul. 12, 2013

(65) Prior Publication Data

US 2014/0014466 A1 Jan. 16, 2014

(30) Foreign Application Priority Data

Jul. 13, 2012 (DE) .......................... 10 2012 106 308

(51) Int. Cl.
| | | |
|---|---|---|
| B29C 49/46 | (2006.01) |
| A61L 2/16 | (2006.01) |
| B65G 37/00 | (2006.01) |
| B29C 49/64 | (2006.01) |
| B29C 49/42 | (2006.01) |

(52) U.S. Cl.
CPC .............. B65G 37/00 (2013.01); B29C 49/4205 (2013.01); B29C 49/46 (2013.01); B29C 49/6418 (2013.01); B29C 2049/4679 (2013.01); B29C 2049/4697 (2013.01)

(58) Field of Classification Search
USPC ................. 264/520, 538; 422/304; 198/343.1, 198/343.2, 867.11; 432/239, 242; 425/182, 425/525, 526, 541
See application file for complete search history.

(56) References Cited

U.S. PATENT DOCUMENTS

| | | | | |
|---|---|---|---|---|
| 5,618,489 | A * | 4/1997 | Weissmann | 264/530 |
| 6,562,281 | B1 * | 5/2003 | Marchau et al. | 264/532 |
| 7,311,515 | B2 * | 12/2007 | Netsu | 425/534 |
| 7,806,680 | B2 * | 10/2010 | Adriansens et al. | 425/526 |
| 7,938,639 | B2 * | 5/2011 | Adriansens et al. | 425/210 |
| 8,047,830 | B2 * | 11/2011 | Kiefl | 425/182 |
| 8,083,512 | B2 * | 12/2011 | Adriansens | 425/174.4 |

(Continued)

FOREIGN PATENT DOCUMENTS

| | | |
|---|---|---|
| DE | 2009047540 | 6/2011 |
| EP | 2329933 | 6/2011 |

(Continued)

OTHER PUBLICATIONS

German Search Report dated Mar. 11, 2013 issued in corresponding German Application No. 10 2012 106 310.9.

(Continued)

*Primary Examiner* — Douglas Hess
(74) *Attorney, Agent, or Firm* — Onello & Mello, LLP.

(57) ABSTRACT

An apparatus for the heating of plastics material pre-forms comprises a movable carrier on which is arranged at least one heating device, the heating device including a holding element for holding and conveying the plastics material pre-forms. A heating cavity is included, into which individual plastics material pre-forms can be inserted. A moving device is suitable for inserting the plastics material pre-forms into the heating cavity. A clean room, inside which the plastics material pre-forms are capable of being heated by the heating cavity is included, wherein the clean room is isolated from an external environment by at least one first wall and at least one second wall, the second wall being constructed and arranged to be movable with respect to the first wall.

14 Claims, 4 Drawing Sheets

(56) References Cited

U.S. PATENT DOCUMENTS

| | | | |
|---|---|---|---|
| 8,544,632 B2 * | 10/2013 | Gillet et al. | 198/465.2 |
| 8,632,325 B2 * | 1/2014 | Voth et al. | 425/3 |
| 8,708,681 B2 * | 4/2014 | Voth et al. | 425/73 |
| 8,771,584 B2 * | 7/2014 | Voth | 264/535 |
| 8,813,951 B2 * | 8/2014 | Forsthoevel et al. | 198/474.1 |
| 8,828,290 B2 * | 9/2014 | Voth et al. | 264/39 |
| 2011/0135288 A1 | 6/2011 | Winzinger et al. | |
| 2012/0038090 A1 | 2/2012 | Voth | |
| 2012/0070340 A1 | 3/2012 | Voth | |
| 2012/0269918 A1 | 10/2012 | Winzinger et al. | |
| 2013/0011807 A1 | 1/2013 | Winzinger et al. | |

FOREIGN PATENT DOCUMENTS

| | | |
|---|---|---|
| EP | 2412511 | 2/2012 |
| EP | 2431058 | 3/2012 |
| JP | 61261024 | 11/1986 |
| WO | 2011066886 | 6/2011 |
| WO | 201166885 | 9/2011 |

OTHER PUBLICATIONS

Extended European Search Report dated Oct. 16, 2013, issued in corresponding European Application No. 13175061.4-1706.

* cited by examiner

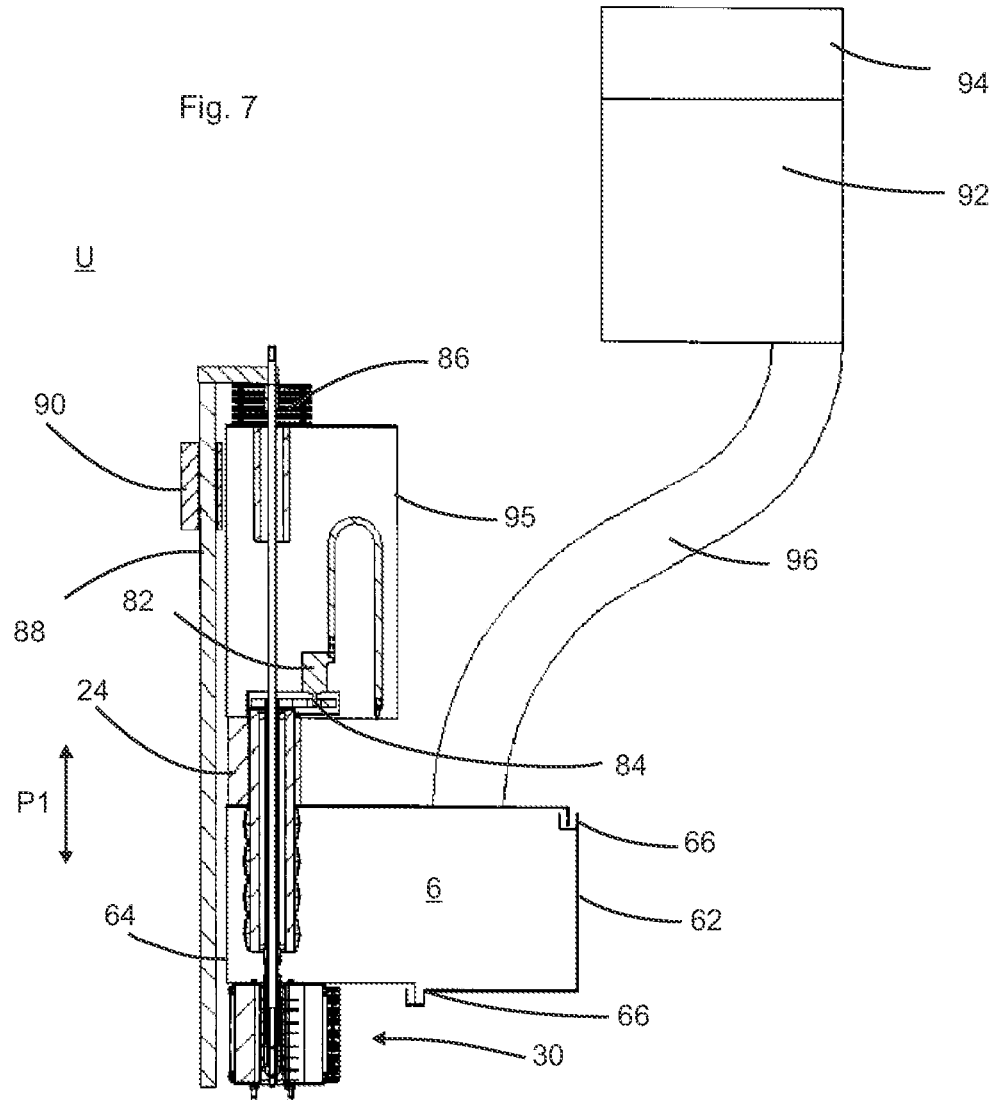

STERILE HEATING APPARATUS FOR PLASTICS MATERIAL PRE-FORMS

RELATED APPLICATIONS

This application claims priority to German patent application number 10 2012 106 308.7 filed Jul. 13, 2012, the entire content of which is incorporated herein by reference, in its entirety.

BACKGROUND

Embodiments of the present inventive concepts relate to an apparatus for the heating of plastics material pre-forms. It is known conventionally for plastics material pre-forms to be shaped into plastic bottles in blow moulding machines. For this purpose these plastics material pre-forms are usually first heated in a furnace. Furnaces are known through which the plastics material pre-forms are conveyed, in which case for example the plastics material pre-forms are conveyed past heating elements, as well as those furnaces which have individual heating stations for heating the plastics material pre-forms. DE 10 2009 047 537 A1 describes a furnace of this type for the conditioning of pre-forms.

For many beverages it is necessary for them to be filled under aseptic conditions. In this case it is known for a sterilization process to sterilize—upstream of the blow moulding machine—plastics material pre-forms which are possibly contaminated by germs. Following this, containers can be transferred to an aseptic filling mechanism by way of an aseptic blow moulding machine.

SUMMARY

Embodiments of the present inventive concepts provide an apparatus and a method that facilitate the production of containers filled under aseptic conditions.

An apparatus according to the inventive concepts for the heating of plastics material pre-forms has a movable carrier on which is arranged at least one heating device. This heating device has in this case a holding element for holding and conveying the plastics material pre-forms, as well as a heating cavity into which the plastics material pre-form is capable of being inserted. In addition, a moving device is provided, which is suitable for inserting the plastics material pre-form into this heating cavity and also for removing the plastics material pre-form out of the heating cavity again. In this case it is advantageous for at least one portion of this heating cavity to be capable of being heated and/or acted upon with microwaves or for microwaves to be capable of being introduced into the heating cavity in order to heat the plastics material pre-forms.

According to the inventive concepts the apparatus has a clean room, inside which the plastics material pre-forms are capable of being heated by means of the heating cavities, and this clean room is bounded off from an environment by at least one first wall and at least one second wall which is designed so as to be movable with respect to the first wall.

It is therefore proposed to provide a treatment room in which the plastics material pre-form is heated, this treatment room being designed in such a way that a clean room is formed which is bounded off on the outside from a non-sterile room and nevertheless advantageously allows the introduction of the necessary process movements without losing its sterility during this.

It is advantageous for the whole of the heating of the plastics material pre-forms to take place in the aforesaid clean room.

The aforesaid heating cavities can move jointly with the plastics material pre-forms. It is advantageous in this case for the heating cavities to be dimensioned in such a way that one plastics material pre-form is inserted into them in each case. It would also be possible, however, for a plurality of plastics material pre-forms to be inserted into the heating cavities at the same time, so that in this way a plurality of plastics material pre-forms are heated simultaneously in the same cavity.

In the case of a further advantageous design the apparatus has a sealing device in order, in particular, to seal off the two walls mentioned above from each other. It is advantageous for this sealing device to be a so-called surge chamber. This means that the sealing device can include a continuous channel which is filled with a liquid and into which an element of the wall movable relatively in each case dips in the manner of a blade. It would also be possible, however, for the channel to be arranged so as to be rotatable.

In the case of a further advantageous design the apparatus has a pressure stressing means in order to act upon the clean room with an over-pressure. In this way, for example, an over-pressure of sterile air can be supplied to the clean room, so as to prevent non-sterile air from penetrating into the clean room from the outside.

In the case of a further advantageous design the carrier is a rotatable carrier. In this way, it is advantageous for the heating cavity to be arranged on this rotatable carrier. It is advantageous for a plurality of heating cavities of this type to be arranged on a rotatable carrier. In this way, it is also advantageous in this case for a rotary drive to be provided for the movement of the plastics material pre-forms. It is advantageous for the clean room to be made annular or toroidal. in some embodiments, the carrier can likewise form a boundary wall of the clean room. In some embodiments, a drive device for driving the carrier can be arranged outside the clean room. In general, at least one region of the apparatus which is situated radially inside the conveying path of the plastics material pre-forms or the heating cavities can be arranged outside the clean room. In this way, the clean room can be designed with a relatively small volume.

It is advantageous for the apparatus to be a STIR or an infrared furnace, but it would also be possible for the apparatus to have one or more microwave generation devices and thus for the plastics material pre-forms to be heated while using microwaves. In addition, an infrared heating and a microwave heating could also be combined with each other.

In the case of a further advantageous design the individual heating cavities are heated or warmed electrically. Heating with a liquid, for example with hot oil, however, would also be possible.

In the case of a further advantageous design the apparatus has a rod-like body which is capable of being inserted at least for a time into the inner space of the plastics material pre-forms through an aperture in the latter during heating of the plastics material pre-forms. In this way, in the case of this design a sort of duplex heating method is proposed, in which heating is can be carried out simultaneously from the inside by way of the aforesaid rod or heating lance and from the outside by way of the heating bush or heating cavity. As mentioned, this heating system is advantageously arranged on a rotary slider. The plastics material pre-forms can be supplied by the latter, transferred to the above-mentioned holding or carrier device for holding and then dipped into the heating cavity. The aforesaid heating lance or the rod-like body is also inserted parallel to the latter into the plastics material pre-form.

The plastics material pre-form now stays in this heating system for a certain heating duration, in which case it is advantageously set in continuous rotation about its longitudinal direction, in order also to achieve a uniform heating around the periphery of the plastics material pre-form in this way. After the heating process the plastics material pre-form is drawn out of the heating cavity again and is transferred to a blow moulding machine.

In the case of a further advantageous design the rod-like body is capable of being heated. This means that the plastics material pre-form is advantageously heated from two sides, namely on one side by the rod-like body and on the other side by the wall of the heating cavity surrounding the pre-form.

In the case of an advantageous design the heating cavity has a first opening by way of which the plastics material pre-form is capable of being supplied to the heating cavity, as well as at least one second opening which is arranged at a distance from the first opening. It is advantageous in this case for this second opening to be arranged at an end of the heating cavity opposite the first opening. It is advantageous for this second opening to be situated at the deepest point of the cavity, so that a cleaning agent can run off, in particular for cleaning purposes.

In the case of an advantageous design the heating cavity is designed to be closed and thus cup-like in a base area. In this case the heating cavity can also screen off the plastics material pre-form itself from germs. In this case it is also possible for the opening mentioned above to be provided in the base, but the latter can be closed.

It is advantageous for the heating cavity to be open in one direction, and in particular open towards the top (for the loading of the pre-forms) and to be advantageously closed off in this direction by an ("upper") insulation room.

In the case of a further advantageous design the base of the heating cavity can be opened, as mentioned above, in order to allow cleaning (cleaning in place, rinsing, gassing) of the heating system. After the heating procedure the opening can be closed again—for example with a CIP cap.

In the case of a further advantageous design the apparatus has a line for conveying a flowable medium, which line is capable of being connected in terms of flow to the second opening. In particular, a liquid and, in particular, a cleaning liquid, can be supplied by way of the latter.

In this case it would also be possible for a plurality of heating cavities to be supplied by a cleaning line. In this way, for example, a central line can be provided into which individual lines which lead to the heating cavities can open. In this way, it is possible for all the heating cavities or heating systems to be rinsed and gassed at the same time. In this case for example, gassing with hydrogen peroxide would also be possible. In the case of a further advantageous design the heating cavity has a wall which completely surrounds the plastics material pre-form in one peripheral direction as well as a base wall. These walls can also merge into each other (for example by way of curved regions).

In this design, as mentioned above, the heating cavity is designed at least substantially in the manner of a cup. In the case of this design the plastics material pre-form is thus not moved through opposed heating devices, as is customary in the prior art, but is situated in a chamber completely surrounding it. It is advantageous for a moving device, which inserts the plastics material pre-form into the heating cavity, to be designed in such a way that the thread of the plastics material pre-form itself is not inserted into the heating cavity. In addition, screening elements can be provided which prevent the aperture region of the plastics material pre-form from being heated.

In the case of a further advantageous design the base wall is designed in the form of a reflector. In this way, radiation arriving at the base wall is reflected onto the plastics material pre-form and can thus heat the latter further. In this design the base wall itself is not capable of being heated in this case. It would also, however, be possible for the base wall to be capable of being heated.

In the case of an advantageous design the moving device, which inserts the plastics material pre-form into the heating cavity, has an electric motor and, in particular, a linear motor.

In the case of a further embodiment a moving device is also provided which inserts the rod-like body mentioned above into the plastics material pre-forms. In addition, this moving device can include in this case an electric motor and, in some embodiments, a linear motor. It is advantageous for the moving device to move the base wall in a longitudinal direction of the plastics material pre-forms and, in particular, in a direction which is at a right angle to a conveying plane of the heating cavities.

In the case of a further advantageous design the base wall is movable with respect to the completely surrounding wall mentioned. In particular, the base wall is movable in a straight direction in this case, and in particular in that direction in which the plastics material pre-form is also moved. In particular, the base wall is movable in the longitudinal of the plastics material pre-form. In this way, an adjustment of the heating cavity to different sizes of plastics material pre-forms can be achieved.

In the case of a further advantageous design at least one folding bellows is provided as a sealing device in order to seal off at least one relative movement taking place in the apparatus. This can be, in particular; the movement of the plastics material pre-forms with respect to the heating cavity, but it would also be possible for a folding bellows to be provided in order to seal off the movement of the above-mentioned rod-like body and/or the base part.

In the case of a further advantageous design at least one inner wall of the heating cavity is capable of being heated to a temperature which is greater than 500° C., in some embodiments>600° C., in some embodiments>700° C. On account of this high operating temperature the respective surfaces of the heating cavity or the heating elements respectively should be regarded as being germ-free.

In the case of a further advantageous design the above-mentioned holding element for holding the plastics material pre-forms is designed at least locally in the form of a hollow shaft. On account of this design in the form of a hollow shaft, the rod can also be introduced through the holding element into the plastics material pre-forms. It would also be possible, however, for the holding elements to grip the plastics material pre-forms on their thread on the outside and thus for the complete cross-section of the aperture to be available for inserting the rod-like body into the plastics material pre-forms.

The present inventive concepts further relate to a method of heating plastics material pre-forms, in which the plastics material pre-forms are conveyed along a pre-set conveying path and are heated during this conveying. In this case the plastics material pre-forms can be inserted into heating cavities and are heated in these heating cavities, so that each plastics material pre-form to be heated is associated with a heating cavity and the heating cavities are moved at least locally along the conveying path. In this case, in order to heat the plastics material pre-forms, it is advantageous for at least one portion of the heating cavity to be heated or for microwaves to be introduced by a microwave output element into the heating cavity.

According to the inventive concepts the plastics material pre-forms can be conveyed at least for a time during the heating thereof inside a clean room, this clean room being bounded off from an environment by at least one first wall and at least one second wall which is designed so as to be movable with respect to the first wall.

It is therefore proposed with respect to the method that the heating of the heating cavities associated in each case with the plastics material pre-forms should be carried out by means of the latter and, in addition, that this heating should be carried out under sterile conditions.

In the case of a method, a rod-shaped element or a rod-like body is inserted at least for a time into the plastics material pre-forms during the heating procedure. It is advantageous for the plastics material pre-forms to be conveyed along a circular path during their heating.

In an aspect, an apparatus for the heating of plastics material pre-forms comprises: a movable carrier on which is arranged at least one heating device, the heating device including a holding element for holding and conveying the plastics material pre-forms; a heating cavity into which individual plastics material pre-forms can be inserted; a moving device suitable for inserting the plastics material pre-forms into the heating cavity; and a clean room, inside which the plastics material pre-forms are capable of being heated by the heating cavity, wherein the clean room is isolated from an external environment by at least one first wall and at least one second wall, the second wall being constructed and arranged to be movable with respect to the first wall.

In some embodiments, the apparatus further comprises a rod-like body insertable at least for a time period into the inner space of the plastics material pre-forms through an aperture thereof during heating of the plastics material pre-forms.

In some embodiments, the rod-like body can be heated.

In some embodiments, the heating cavity comprises a first opening by way of which the plastics material pre-form is capable of being supplied to the heating cavity; and at least one second opening positioned to be spaced apart from the first opening.

In some embodiments, the apparatus further comprises a line for conveying a flowable medium to the second opening.

In some embodiments, the heating cavity further comprises: a side wall which surrounds an inserted plastics material pre-form in a peripheral direction; and a base wall.

In some embodiments, the base wall is movable with respect to the side wall.

In some embodiments, the apparatus further comprises at least one folding bellows to seal off at least one relative movement taking place in the apparatus from an external environment.

In some embodiments, the at least one inner wall of the heating cavity can be heated to a temperature greater than 500° C.

In some embodiments, the holding element for holding the plastics material pre-forms at least partially comprises a hollow shaft.

In an aspect, a method of heating plastics material pre-forms, comprises: conveying the plastics material pre-forms along a pre-set conveying path and heating the plastics material pre-forms during the conveying; inserting the plastics material pre-forms into heating cavities for heating the plastics material pre-forms so that each plastics material pre-form to be heated is associated with a heating cavity, wherein heating the plastics material pre-forms comprises heating at least one portion of the heating cavity; and moving the heating cavities at least locally along the conveying path, wherein the plastics material pre-forms are conveyed at least for a time during the heating thereof in a clean room, the clean room being isolated from an external environment by at least one first wall and at least one second wall that is movable with respect to the first wall.

In some embodiments, a rod-shaped body is inserted for at least a time period into the plastics material pre-forms during the heating of the plastics material pre-forms.

In some embodiments, heating the plastics material pre-forms further comprises introducing microwaves into the heating cavity.

BRIEF DESCRIPTION OF THE DRAWINGS

Further advantages and embodiments are evident from the accompanying drawings. In the drawings

FIG. 7 is an illustration of the heating device shown in FIG. 6 in a different operating state.

DETAILED DESCRIPTION OF EMBODIMENTS

Figure 1:
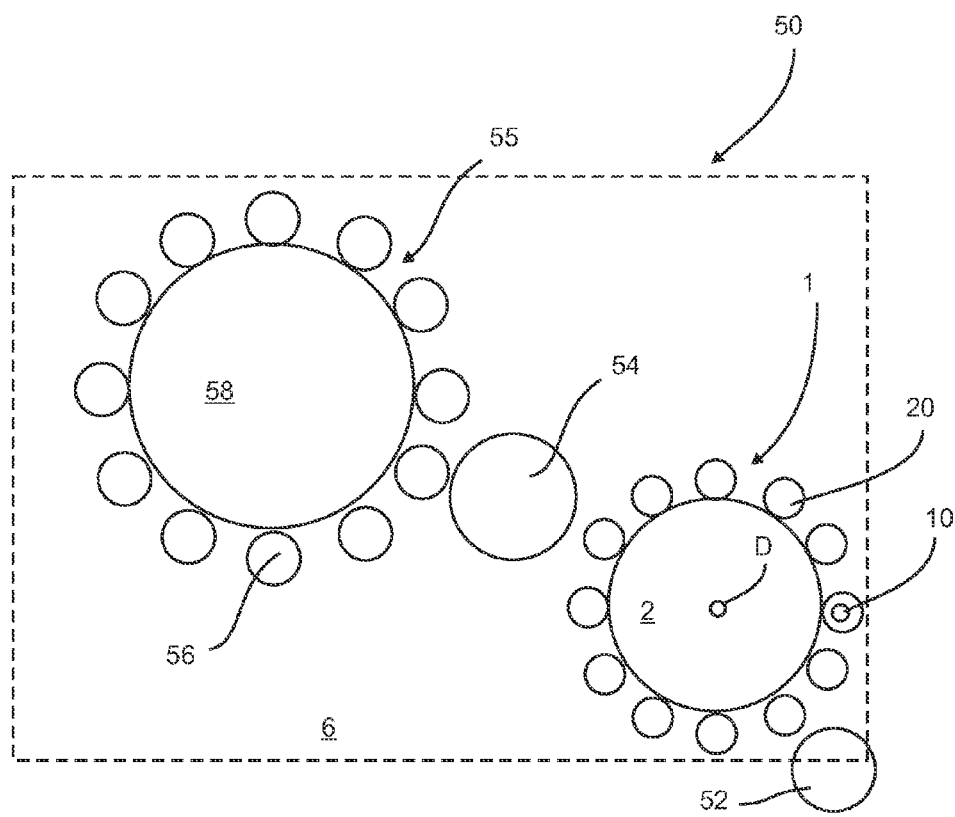
FIG. 1 is a diagrammatic illustration of a plant for the treatment of containers.

Exemplary embodiments in accordance with principles of inventive concepts will now be described more fully with reference to the accompanying drawings, in which exemplary embodiments are shown. Exemplary embodiments in accordance with principles of inventive concepts may, however, be embodied in many different forms and should not be construed as being limited to the embodiments set forth herein; rather, these embodiments are provided so that this disclosure will be thorough and complete, and will fully convey the concept of exemplary embodiments to those of ordinary skill in the art. Like reference numerals in the drawings denote like elements, and thus their description may not be repeated.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of exemplary embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Exemplary embodiments in accordance with principles of inventive concepts are described herein with reference to cross-sectional illustrations that are schematic illustrations of idealized embodiments (and intermediate structures) of exemplary embodiments. As such, variations from the shapes of the illustrations as a result, for example, of manufacturing techniques and/or tolerances, are to be expected. Thus, exemplary embodiments in accordance with principles of inventive concepts should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of exemplary embodiments.

Unless otherwise defined, all terms (including technical and scientific terms) used herein have the same meaning as commonly understood by one of ordinary skill in the art to which exemplary embodiments in accordance with principles of inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a diagrammatic illustration of a plant 50 for the treatment of containers. In this case plastics material pre-forms 10 (only one shown) are supplied by way of a supply device 52 to a heating apparatus designated 1 as a whole. This heating apparatus has a carrier 2 which is rotatable in this case about an axis of rotation D and on which a plurality of heating devices or stations 20 respectively are arranged. After they have been heated, the plastics material pre-forms are transferred by way of a transfer star wheel 54 to a shaping device designated 55 as a whole for the shaping of plastics material pre-forms into plastics material containers. This shaping device also has a rotatable carrier 58 and a plurality of shaping stations 56 arranged on it. In this case the shaping device 55 is advantageously a blow moulding machine, and in particular a stretch blow moulding machine.

Both the heating device 1 and the shaping device 55 are arranged in this case in a clean room 6 illustrated only diagrammatically. This means that the plastics material pre-forms are already conveyed inside this clean room 6 during their heating. In addition, it would be possible for the plant to have for example sterilization devices which sterilize the heating devices 20 or even the plastics material pre-forms 10 themselves. The supply device 52 can also be arranged in this case at least locally in the clean room 6.

Figure 2:
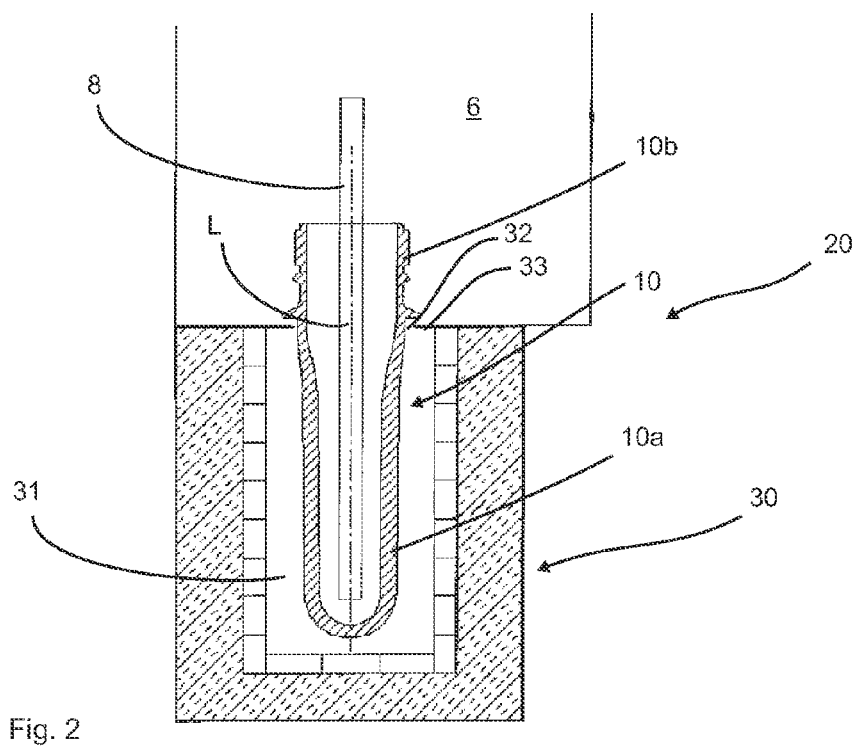
FIG. 2 is a detailed view of a heating device.

FIG. 2 is a partial illustration of a heating device 20. This heating device has a heating cavity which is designated 30 as a whole and which forms a hollow space 31 into which the plastics material pre-form 10 is inserted. This plastics material pre-form 10 has in this case a main body 10a as well as a threaded region 10b. This threaded region does not arrive in the heating cavity 30 during the heating. It is possible in fact for screening devices 33 to be provided which prevent heating of the thread. The reference number 32 designates an opening in the heating cavity 30 by way of which the plastics material pre-form 10 can be supplied to the heating cavity 30. Each screening device 33 can be designed in this case in the form of a plate which in turn has an opening through which the plastics material pre-form 10 is capable of being passed.

The reference number 8 designates a rod-like body which is likewise inserted into the plastics material pre-forms 10 in this case during the heating. This rod-like body 8 also heats the plastics material pre-forms 10 at an internal region thereof. In this way, a uniform heating of the plastics material pre-forms 10 is possible. The reference letter L designates the longitudinal direction of the plastics material pre-forms which coincides in this case with the longitudinal direction and movement direction of the rod-like body.

In this case, the reference number 6 again designates the clean room, inside which the plastics material pre-forms are heated. Since the heating cavity 30 is likewise closed off here, the hollow space 31 also forms part of the clean room 6.

Figure 3:
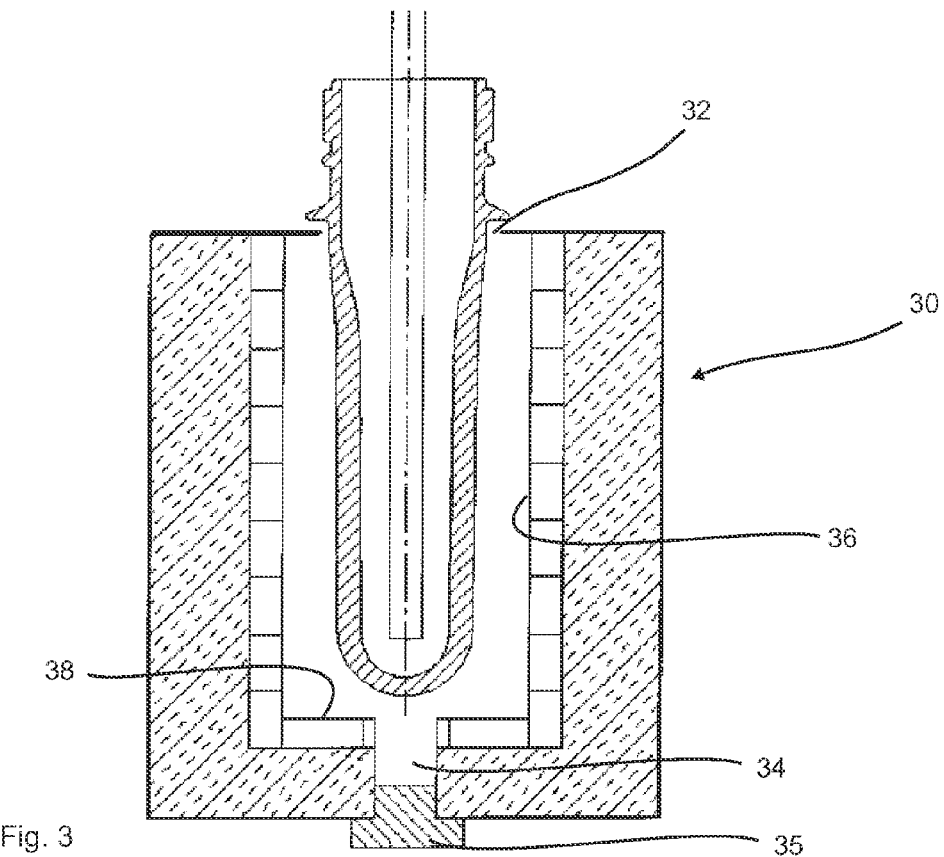
FIG. 3 is a detailed view of a heating device.

FIG. 3 shows a further design of a heating cavity 30. In this case inner walls 36 are shown which completely surround the plastics material pre-form 10 in the peripheral direction thereof. In some embodiments, the inner wall can have a circular cross-section. In such case, the hollow space 31 has a locally cylindrical shape. In this manner, essentially a uniform distance from the plastics material pre-form 10 is observed and the latter is thus uniformly heated. In addition, it is possible for the plastics material pre-form 10 to be rotated about the longitudinal axis thereof for uniform heating. It would also be possible, however, for the heating with the heating cavity deliberately to have a profile deviating in the peripheral direction, for example, in order to shape containers which have a shape deviating from a circular cross-sectional shape.

The reference number 34 refers to an opening by way of which for example a sterilization agent for cleaning the inner walls can be introduced and/or removed. The reference number 38 designates a base area of the heating cavity. The opening 34 can be closed by means of a closure device 35, in particular in order to maintain the sterile room 6.

Figure 4:
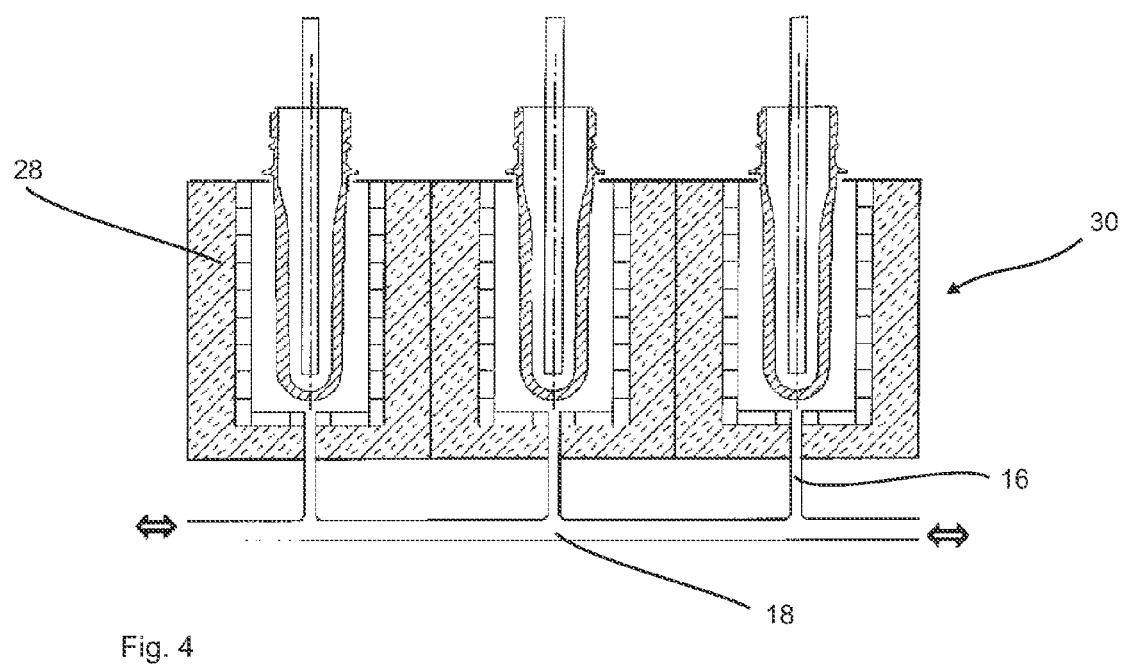
FIG. 4 is a detailed view of a plurality of heating devices.

FIG. 4 shows a further design of the present inventive concepts. In this case three heating cavities 30, which are arranged adjacent to one another and in which plastics material pre-forms 10 are situated in each case, are shown. The reference number 16 designates a line device by way of which a sterilization agent is supplied to the individual heating cavities or can be removed therefrom. In this case it is possible for these individual lines 16 to be connected to one another and to open into a central line 18. This line 18 can be designed in this case in the form of an annular duct. The interior 31 is at the same time a lower sterile room in this case, which is adjoined by the upper sterile room shown in FIG. 1. These rooms together form the clean room 6.

Figure 5:
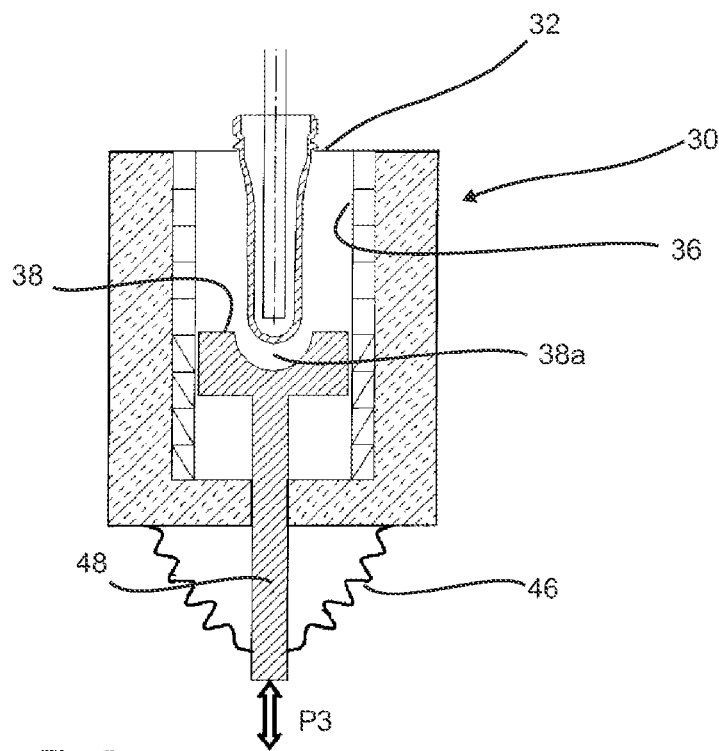
FIG. 5 is an illustration of a heating device with a displaceable base part.

FIG. 5 shows a further representation of a heating cavity 30. In this case too, the continuous wall 36 is again shown, as well as the base wall 38. In this case, however, this base wall 38 is movable in the direction P3 and is arranged on a carrier 48. The reference number 46 designates a sealing device such as a folding bellows which seals off the movement of the base part 38 in the direction P3. On account of this displaceability of the base part 38 it is possible to adapt the heating cavity to different sizes of the pre-form. In this case the base part can have a recess 38a. In this way, in particular, the heating of the base part of the plastics material pre-form can be improved, since this region can be surrounded in a matching manner, as shown in FIG. 5. This recess 38a can also be provided independently of the movability of the base wall.

Figure 6:
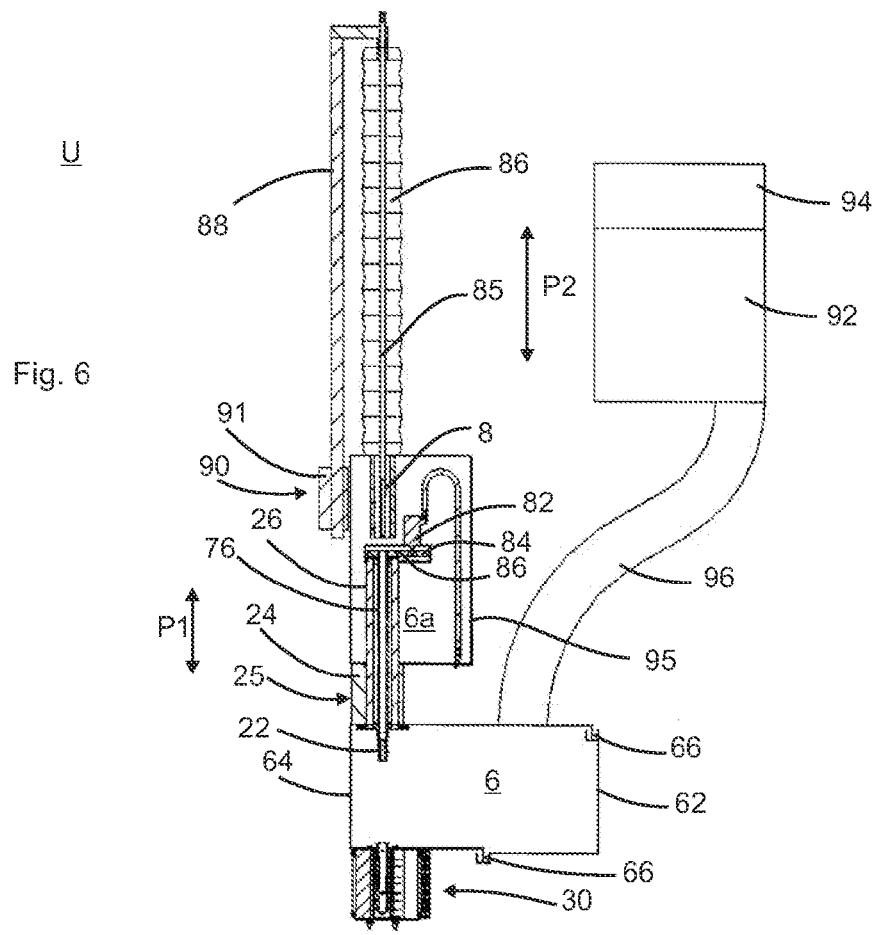
FIG. 6 is a further illustration of a heating device according to the inventive concepts.

FIG. 6 is a further illustration of the apparatus according to the inventive concepts. In this case the heating device 30 and the clean room 6 adjoining it are again evident. This clean room 6 is advantageously configured in an annular shape here and has a first wall 62 and a second wall 64. This second wall 64 is arranged so as to be movable or rotatable respectively in this case and the wall 62 is arranged so as to be stationary. The reference numbers 66 refer to sealing devices which seal off the movement between the walls. These sealing devices are in this case, as mentioned above, designed in each case in the form of a so-called surge tank, in which case a portion of the wall 64 engages in a channel formed by the wall 62. An over-pressure can prevail in the sterile room 6 in this case in order to prevent the penetration of germs. In addition, a blower 92 is provided in order to supply the sterile room 6 by way of a line 96. The reference number 94 designates a filter device, such as for example a HEPA filter.

The reference number 24 designates a stator of a linear motor 25 which is used to move the plastics material pre-forms into the heating cavity 30 (as well as for moving them out of the heating cavity). The associated movable part or secondary part, i.e. the slider, is designated with the reference number 26 here. This slider 26 is designed in this case in the form of a hollow shaft, so that the rod-like body 8 can also be introduced into the plastics material pre-form through this hollow shaft.

The reference number 22 designates a holding device for holding the plastics material pre-forms 10. This holding device can be constructed and arranged in this case in the form of a holding mandrel which engages in the apertures of the plastics material pre-forms and thus holds them from the inside. Holding devices would also be possible, however, which grip the plastics material containers from the outside. It would also be possible, however, for the rod-like body 8 which is capable of being inserted into the plastics material pre-forms to be arranged directly on the holding device. In this way, the holding device could be designed in the form of an elongate mandrel which has a portion which is capable of being inserted into the plastics material pre-forms as well as a portion which holds the plastics material pre-forms.

The reference number 90 designates a second electric motor drive and the reference number 91 designates the stator thereof. The reference number 88 designates the slider of this second drive device 90. In this case this slider 88 moves a carrier rod 85 likewise in the direction P2. The reference number 86 designates a folding bellows which seals this movement of the carrier 85 in the direction P2 off from the environment U. Instead of the linear motors it is also possible for other types of drive to be used, such as for example pneumatic or hydraulic drives or even other electric motors. The reference number 82 designates a drive, in particular an electric motor, which produces a rotational movement of the plastics material pre-form about the longitudinal axis thereof, i.e. the longitudinal direction L. This drive 82 can have in this case an output gear 84 which drives a gearwheel 86 arranged on a carrier 76. The holding device 22 for holding the plastics material pre-forms 10 is in turn arranged on this carrier 76 and thus jointly rotates.

FIG. 7 shows the apparatus of FIG. 6 in an operating state. This means that in this case the plastics material pre-form is moved into the heating cavity 30 and the rod-like body 8 is also in turn moved into the plastics material pre-form 10. In a corresponding manner the folding bellows 86 is in a compressed state and also the drive 82, which is used for a rotational movement of the plastics material pre-form about the longitudinal axis thereof, is in the lower position. The reference number 95 designates a housing which acts in this case as an upper portion 6a of the clean room for the apparatus. If necessary it would also be possible for the motor unit 90, 88 to be switched off, so that with this design the rod body 22 is then not inserted into the plastics material pre-form 10, but only the plastics material pre-form 10 itself is inserted into the heating cavity 30.

The Applicants reserve the right to claim all the features disclosed in the application documents as being essential to the inventive concepts, insofar as they are novel either individually or in combination as compared with the prior art.

What is claimed is:

1. An apparatus for the heating of plastics material pre-forms comprising:
    a movable carrier on which is arranged at least one heating device, the heating device including a holding element for holding and conveying the plastics material pre-forms;
    a heating cavity into which individual plastics material pre-forms can be inserted;
    a moving device suitable for inserting the plastics material pre-forms into the heating cavity; and
    a clean room, inside which the plastics material pre-forms are capable of being heated by the heating cavity, wherein the clean room is isolated from an external environment by at least one first wall and at least one second wall, the second wall being constructed and arranged to be movable with respect to the first wall, wherein the apparatus further comprises a rod-like body insertable at least for a time period into an inner space of the plastics material pre-forms through an aperture thereof during heating of the plastics material pre-forms.

2. An apparatus according to claim 1, wherein the rod-like body can be heated.

3. An apparatus according to claim 1, wherein the heating cavity comprises a first opening by way of which the plastics material pre-form is capable of being supplied to the heating cavity; and at least one second opening positioned to be spaced apart from the first opening.

4. An apparatus according to claim 3, further comprising a line for conveying a flowable medium to the second opening.

5. An apparatus according to claim 1, wherein the heating cavity further comprises: a side wall which surrounds an inserted plastics material pre-form in a peripheral direction; and a base wall.

6. An apparatus according to claim 5, wherein the base wall is movable with respect to the side wall.

7. An apparatus according to claim 1, further comprising at least one folding bellows to seal off at least one relative movement taking place in the apparatus from an external environment.

8. An apparatus according to claim 1, wherein the at least one inner wall of the heating cavity can be heated to a temperature greater than 500° C.

9. An apparatus according to claim 1, wherein the holding element for holding the plastics material pre-forms at least partially comprises a hollow shaft.

10. A method of heating plastics material pre-forms, comprising:
conveying the plastics material pre-forms along a pre-set conveying path and heating the plastics material pre-forms during the conveying;
inserting the plastics material pre-forms into heating cavities for heating the plastics material pre-forms so that each plastics material pre-form to be heated is associated with a heating cavity, wherein heating the plastics material pre-forms comprises heating at least one portion of the heating cavity; and
moving the heating cavities at least locally along the conveying path,
wherein the plastics material pre-forms are conveyed at least for a time during the heating thereof in a clean room, the clean room being isolated from an external environment by at least one first wall and at least one second wall that is movable with respect to the first wall, wherein a rod-shaped body is inserted for at least a time period into the plastics material pre-forms during the heating of the plastics material pre-forms.

11. A method according to claim 10, wherein heating the plastics material pre-forms further comprises introducing microwaves into the heating cavity.

12. An apparatus for the heating of plastics material pre-forms comprising:
a movable carrier on which is arranged at least one heating device, the heating device including a holding element for holding and conveying the plastics material pre-forms;
a heating cavity into which individual plastics material pre-forms can be inserted, wherein the heating cavity comprises a first opening by way of which the plastics material pre-forms are capable of being supplied to the heating cavity; and at least one second opening positioned to be spaced apart from the first opening;
a moving device suitable for inserting the plastics material pre-forms into the heating cavity; and
a clean room, inside which the plastics material pre-forms are capable of being heated by the heating cavity, wherein the clean room is isolated from an external environment by at least one first wall and at least one second wall, the second wall being constructed and arranged to be movable with respect to the first wall.

13. An apparatus for the heating of plastics material pre-forms comprising:
a movable carrier on which is arranged at least one heating device, the heating device including a holding element for holding and conveying the plastics material pre-forms;
a heating cavity into which individual plastics material pre-forms can be inserted;
a moving device suitable for inserting the plastics material pre-forms into the heating cavity;
a clean room, inside which the plastics material pre-forms are capable of being heated by the heating cavity, wherein the clean room is isolated from an external environment by at least one first wall and at least one second wall, the second wall being constructed and arranged to be movable with respect to the first wall; and
at least one folding bellows to seal off at least one relative movement taking place in the apparatus from the external environment.

14. A method of heating plastics material pre-forms, comprising:
conveying the plastics material pre-forms along a pre-set conveying path and heating the plastics material pre-forms during the conveying;
inserting the plastics material pre-forms into heating cavities for heating the plastics material pre-forms so that each plastics material pre-form to be heated is associated with a heating cavity, wherein heating the plastics material pre-forms comprises heating at least one portion of the heating cavity, and wherein heating the plastics material pre-forms further comprises introducing microwaves into the heating cavity; and
moving the heating cavities at least locally along the conveying path,
wherein the plastics material pre-forms are conveyed at least for a time during the heating thereof in a clean room, the clean room being isolated from an external environment by at least one first wall and at least one second wall that is movable with respect to the first wall.

* * * * *